United States Patent

Odani et al.

[11] Patent Number: 4,542,208
[45] Date of Patent: Sep. 17, 1985

[54] DISAZO COMPOUNDS FOR DYEING CELLULOSIC FIBERS

[75] Inventors: Junji Odani, Yono; Shigeyuki Watanabe, Tokyo, both of Japan

[73] Assignee: Nippon Kayaku Kabushiki Kaisha, Tokyo, Japan

[21] Appl. No.: 539,746

[22] Filed: Oct. 6, 1983

[30] Foreign Application Priority Data

Oct. 22, 1982 [JP] Japan .................. 57-184638

[51] Int. Cl.$^4$ .................. C09B 43/16; C07D 251/70
[52] U.S. Cl. .................. 534/797; 534/598; 534/637; 534/818; 534/884
[58] Field of Search .................. 260/153; 534/797

[56] References Cited

U.S. PATENT DOCUMENTS 4,337,195  1/1982  Vater et al. .................. 260/146 T

FOREIGN PATENT DOCUMENTS 52-84233 of 1977 Japan .................. 260/153

Primary Examiner—Charles F. Warren
Attorney, Agent, or Firm—Henry C. Nields

[57] ABSTRACT

Water-soluble azo compounds which, in the free acid form, are represented by the formula:

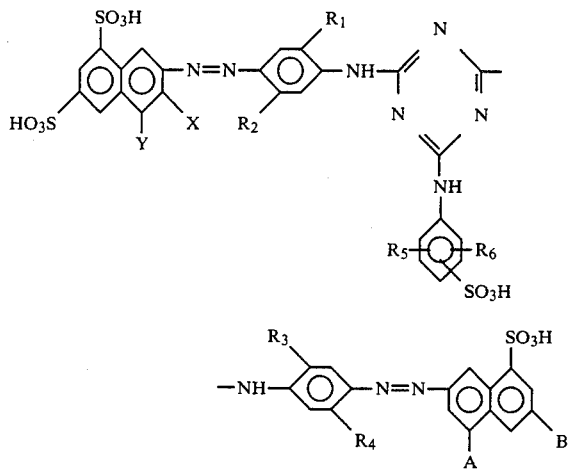

wherein one of X and Y is hydrogen and the other is $-SO_3H$; one of A and B is hydrogen and the other is $-SO_3H$; each of $R_1$, $R_2$, $R_3$ and $R_4$ is independently hydrogen, methyl group, ethyl group, methoxy group, ethoxy group, acylamino group or ureido group; and each of $R_5$ and $R_6$ is independently hydrogen, methyl group, ethyl group, methoxy group, ethoxy group, acylamino group, chlorine, hydroxyl group or carboxyl group, and a method for dyeing cellulose fibers, blended yarn fabrics of cellulose fibers with other kinds of fibers, particularly with polyester fibers, using the said compounds.

7 Claims, No Drawings

DISAZO COMPOUNDS FOR DYEING CELLULOSIC FIBERS

DETAILED DESCRIPTION OF THE INVENTION

This invention relates to a novel disazo dye.

More particularly, the present invention relates to a disazo compound represented by the following formula (I) and to a dyeing method of dyeing cellulosic fibers using the disazo compound:

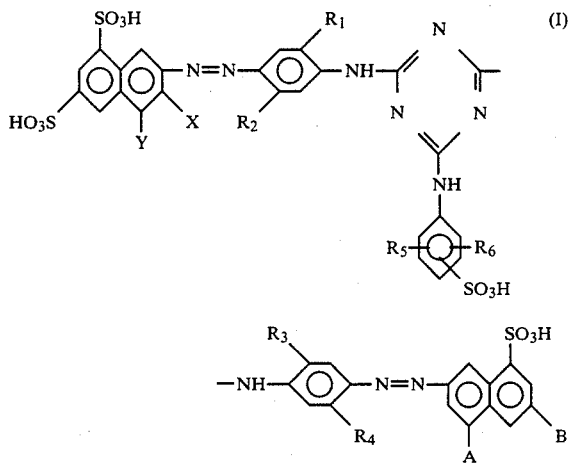

wherein one of X and Y is hydrogen and the other is —$SO_3H$ group; one of A and B is hydrogen and the other is —$SO_3H$ group; each of $R_1$, $R_2$, $R_3$ and $R_4$ is independently hydrogen, methyl group, ethyl group, methoxy group, ethoxy group, acylamino group or ureido group; and each of $R_5$ and $R_6$ is independently hydrogen, methyl group, ethyl group, methoxy group, ethoxy group, acylamino group, chlorine, hydroxyl group or carboxyl group.

The disazo compound in accordance with the present invention is suitable for dyeing natural or regenerated cellulose fibers and particularly for dyeing cotton and cotton-containing fibers. The disazo compound is characterized in that it provides yellow to orange coloured fibers having high fastnesses.

Naphthol dyes, indanthrene dyes, sulfur dyes, reactive dyes and direct dyes have been used for dyeing natural or regenerated cellulose fibers but they involve merits and demerits in conjunction with the extent of attaining required fastnesses, the degree of complication of procedures and control of the dyeing process, disposal load of waste dye liquor, and the like.

When dyeing blended yarn fabrics, or knitted or woven union cloths of cellulose fibers with other kinds of fibers such as synthetic fibers, particularly when dyeing blended yarn fabrics of polyester with cotton, the dyeing of the polyester fibers using a disperse dye must be carried out under the condition of a high temperature acidic bath and this condition does not always agree with the dyeing condition of the dyes for the cellulose fibers. Accordingly, complicated procedures such as so-called two-bath dyeing or one-bath two-step dyeing are usually necessary. Thus a critical problem to be solved is to improve dyeing efficiency and to realize one-bath one-step dyeing.

One possible solution for this problem may be use of a direct dye because it facilitates the dyeing procedures and process control and has high adaptability to varying dyeing conditions and because the disposal load of its waste liquor is low. However, direct dyes in general have low color fastness, especially to washing, for cellulose fibers, particularly for cotton and their color fastnesses to perspiration, light and chlorine are also insufficient. Hence, the application of these dyes is limited.

In order to improve the dyeing efficiency of cellulose fibers, to rationalize the dyeing process and to further raise the fastnesses of dyed products, the inventors of the present invention have carried out intensive studies and has found that the disazo dye represented by the afore-mentioned formula (I) satisfy all these requirements. The present invention is completed on the basis of this finding.

A large number of dyes having structures analogous to those represented by the formula (I) are known heretofore, as typified by Color Index Direct Yellow 50 (C.I. No. 29025), the dyes disclosed in Japanese Patent Publication No. 7643/1958, the dyes disclosed in Japanese Patent Laid-Open No. 84233/1977, and the like.

Though these heretofore known dyes are used for dyeing cellulose fibers, they are primarily directed to regenerated cellulose fibers such as so-called "Rayon", paper and pulp, and involve a large number of problems in their application to cellulose fibers, especially to cotton. These known dyes will be compared with the dye in accordance with the present invention in the following Table.

| No. | Dye Structure* | Fastness Characteristics | | | |
|---|---|---|---|---|---|
| | | washing | light and perspiration | chlorine | adaptability to high-temperature acidic bath |
| 1 | C.I. Direct Yellow 50 (C.I. No. 29025) | 3 | 3 | 3 | x (decomposed) |
| 2 | dye of Japanese Patent Publication No. 7643/1958 (Example 2) | 1-2 | 4 | 4 | o |
| 3 | dye of Japanese Patent Laid-Open No. 84233/1977 (Example 1) | 2 | 4 | 4 | o |
| 4 | dye of Japanese Patent Laid-Open No. 84233/1977 | 3 | 4 | 4 | Δ (inferior fixing) |

-continued

| No. | Dye Structure* | Fastness Characteristics | | | |
|---|---|---|---|---|---|
| | | washing | light and perspiration | chlorine | adaptability to high-temperature acidic bath |
| | (Example 33) | | | | |
| 5 | dye of Example 1 | 4 | 4 | 4 | o |
| 6 | dye of Example 2 | 4 | 4 | 4 | o |
| 7 | dye of Example 8 | 4 | 4 | 4 | o |
| 8 | dye of Example 15 | 4 | 4 | 4 | o |

*No. 1~No. 4: Known dyes
No. 5~No. 8: Dyes of This Invention

In this Table, the dyeing characteristics and the fastness test are based on the following test standards.
Washing: J.I.S. L0844 (1973) A-2
Light and perspiration: J.I.S. L0888 (1977) alkaline
Chlorine: I.S.O. 105-E03-1978, available Cl 20 ppm
Adaptability to high-temperature acidic bath: 130° C., pH 4.5±0.5

As can be seen clearly from this Table, the dye of the present invention is superior to the heretofore known dyes.

The disazo compounds of the formula (I) of the present invention can be generally produced by the following method.

First, aminoazo compounds of the following formulas (II) and (III) are prepared:

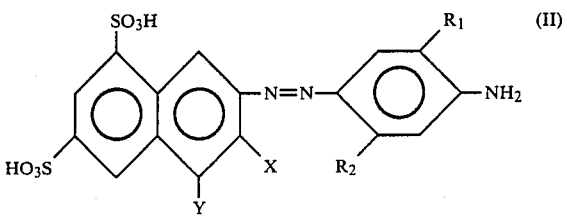

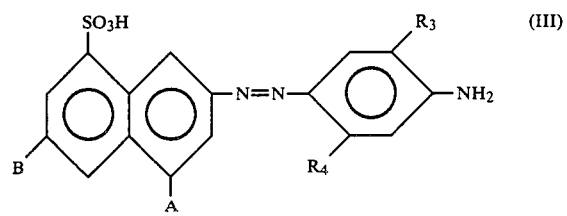

wherein one of X and Y is hydrogen and the other is —SO₃H group; one of A and B is hydrogen and the other is —SO₃H group; and each of R₁, R₂, R₃ and R4 is independently hydrogen, methyl group, ethyl group, methoxy group, ethoxy group, acyamino group or ureido group.

The aminoazo compound of the formula (II) is produced generally by diazotizing a corresponding 2-aminonaphthalenetrisulfonic acid (e.g., 2-amino-3,6,8-naphthalenetrisulfonic acid or 2-amino-4,6,8-naphthalenetrisulfonic acid) and coupling the resulting compound with a corresponding aniline or an N-ω-methanesulfonic acid of aniline (e.g., aniline, 2-methylaniline, 3-methylaniline, 2-methoxyaniline, 3-methoxyaniline, 2-ethoxyaniline, 2,5-dimethylaniline, 2-methoxy-5-methylaniline, 2-ethoxy-5-methylaniline, 2,5-dimethoxyaniline, 2,5-diethoxyaniline, 3-acetylaminoaniline, 3-ureidoaniline, or 2-methoxy-5-acetylaminoaniline) or hydrolyzing the product after coupling.

Similarly, the aminoazo compound of the formula (III) is produced by diazotizing a corresponding 2-aminonaphthalenedisulfonic acid (e.g., 2-amino-4,8-naphthalenedisulfonic acid or 2-amino-6,8-naphthalenedisulfonic acid) and then coupling the resulting diazo compound with a corresponding aniline or an N-ω-methanesulfonic acid of aniline or hydrolyzing the product after coupling.

Next, the aminoazo compounds of the formulas (II) and (III) are condensed with a cyanuric trihalide (e.g., cyanuric bromide, cyanuric fluoride and preferably cyanuric chloride) in an arbitrary sequence and then with a substituted aminobenzenesulfonic acid represented by the following formula (IV) to obtain the disazo compound of the formula (I):

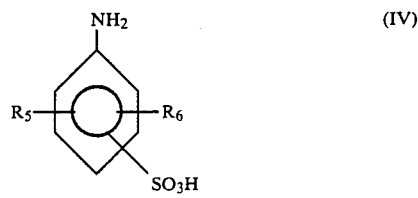

wherein each of R₅ and R₆ is independently hydrogen, methyl group, ethyl group, methoxy group, ethoxy group, acylamino group, chlorine, hydroxyl group or carboxyl group. (Examples include 2-aminobenzenesulfonic acid, 3-aminobenzenesulfonic acid, 4-aminobenzenesulfonic acid, 2-amino-5-methylbenzenesulfonic acid, 2-amino-5-methoxybenzenesulfonic acid, 3-amino-4-methoxybenzenesulfonic acid, 3-amino-4-hydroxybenzenesulfonic acid, 2-amino-5-acetyaminobenzenesulfonic acid, 2-amino-4-acetylaminobenzenesulfonic acid, 3-amino-4-chlorobenzenesulfonic acid, 4-amino-3,6-dichlorobenzenesulfonic acid, 4-amino-3-carboxybenzenesulfonic acid, 3-amino-4-hydroxy-5-carboxybenzenesulfonic acid, and 4-amino-2,5-dimethylbenzenesulfonic acid).

The condensation reaction between the cyanuric trihalide and each of the compounds described above can be carried out by ordinary methods but suitable reaction conditions are as follows.

The first condensation is effected at a temperature of 0° to 25° C. and a pH of 3 to 7 and preferably at 5° to 15° C. and a pH of 4 to 6.5. The second condensation is effected at a temperature of 30° to 80° C. and a pH of 5 to 8 and preferably at 50° to 70° C. and a pH of 6 to 7. The third condensation is effected at a temperature of 70° to 105° C. and a pH of 2 to 6 and preferably at 80° to 100° C. and a pH of 3 to 5.

The resulting disazo compound of the formula (I) can be isolated by ordinary methods. That is, the reaction solution is either concentrated by evaporation or salted out in a customary manner followed by filtration, separation and drying.

The disazo compound of the present invention has high substantivity to cellulose fibers and suitability to a high temperature acidic dye bath and is characterized in that it dyes natural or regenerated cellulose fibers, particularly cotton and cotton-containing fibers with high fastnesses, particularly with high wet color fastness, in colors ranging from yellow to orange.

It is specifically to be noted that high-temperature one-bath one-step dyeing can be applied to cotton-containing fibers such as synthetic fibers and cotton blended yarn fabrics, especially polyester fibers and cotton blended yarn fabrics, by the joint use of a disperse dye for polyester.

Hereinafter, the present invention will be described in further detail with reference to Examples thereof.

EXAMPLE 1

Diazotized 2-amino-3,6,8-naphthalenetrisulfonic acid was coupled with aniline-ω-methanesulfonic acid under a weakly acidic condition and then its ω-methanesulfonic acid group was dissociated in an alkaline solution. 48.7 parts of the aminoazo compound obtained in this manner was dissolved in water. 18.5 parts of cyanuric chlorine was added to this solution at a temperature of 5° to 10° C. and the pH was then adjusted to 5 to 6 by adding sodium carbonate to effect the reaction. After the reaction was completed, a solution in 400 parts of water of 42.1 parts of an aminoazo compound obtained by coupling diazotized 2-amino-4,8-naphthalenedisulfonic acid with 3-methylaniline under a weakly acidic condition was added to the reaction solution and the resulting mixture was gradually heated to effect the reaction at 60° to 70° C.

During the reaction, the pH was kept at 6 to 7 by adding sodium carbonate. The reaction solution containing the following compound, in the free acid form, were obtained.

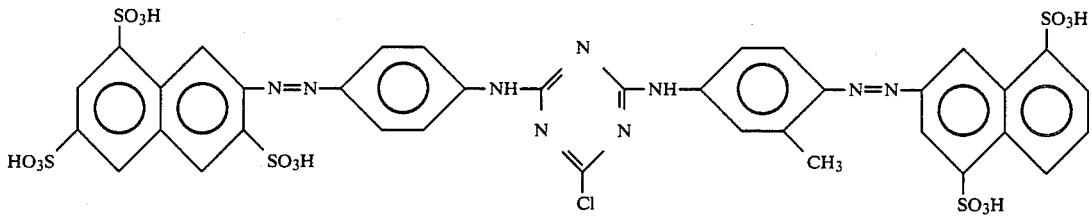

After the reaction was completed, 26 parts of 3-aminobenzenesulfonic acid was added and the mixture was heated to effect the reaction at 90° to 95° C. During the reaction, the pH was kept at 4 to 5 by adding sodium carbonate.

After the reaction was completed, 20% sodium chloride was added to the reaction solution and the precipitated crystal was collected by filtration. This compound corresponded to the one represented by the following formula: (as a free acid)

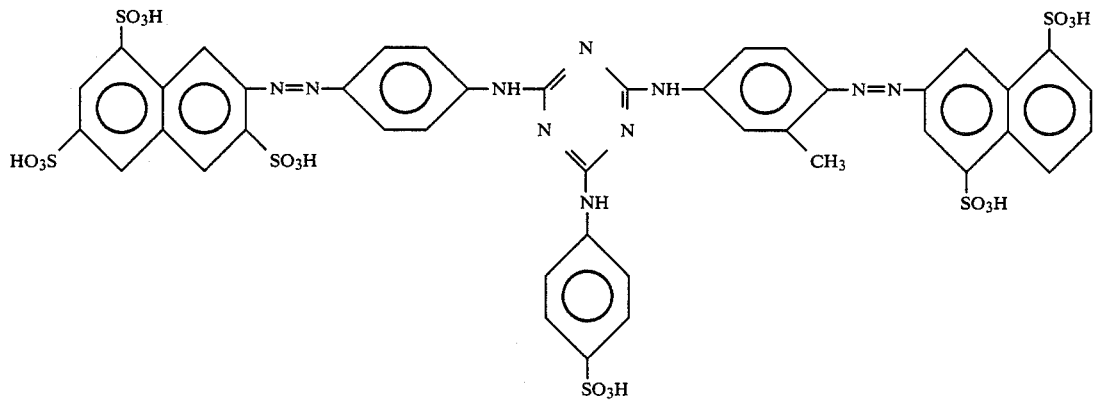

This compound dissolved extremely well in water and provided a yellow solution. Its maximum absorption wavelength ($\lambda$ max, in water) was 390 nm. It exhibited a high substantivity to cotton and provided a yellow dyed product.

The color fastness was class 5 to light, class 4 to washing, class 4 to light and perspiration and class 4 to chlorine.

EXAMPLE 2

The dye was produced in accordance with the method of Example 1 except that 26 parts of 4-aminobenzenesulfonic acid was used in place of 3-aminobenzenesulfonic acid in the third condensation reaction.

The obtained dye corresponded to the one represented by the following formula: (as a free acid)

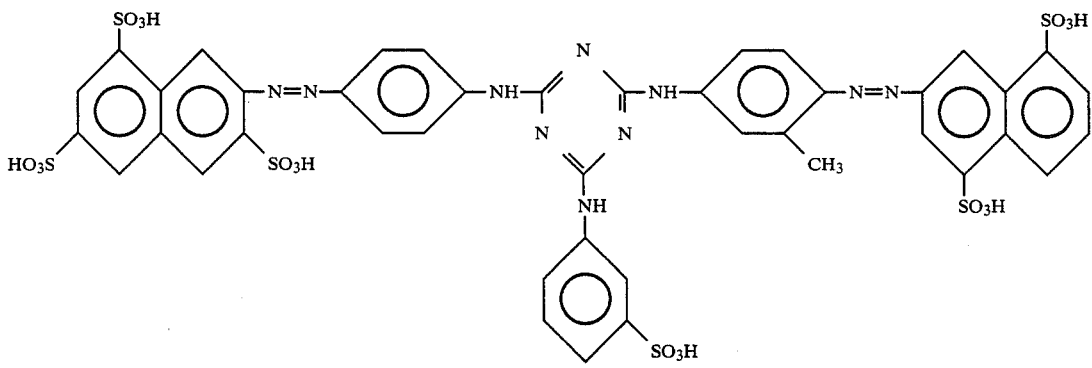

This dye dissolved extremely well in water and provided a yellow solution. Its $\lambda$ max was 390 nm (in water).

This dye dyed cotton a uniform yellow and its color fastness was extremely excellent.

EXAMPLES 3 TO 7

Dyes were produced in the same way as in Example 1 except thaat aminobenzenesulfonic acids of the following corresponding formula (IV) were used in place of 3-aminobenzenesulfonic acid in the third condensation reaction and the obtained compounds, which were represented as free acids, and their λ max values in aqueous solutions were shown in Table 1.

Each dye dyed cotton a uniform yellow and its fastness was excellent.

EXAMPLE 8

Diazotized 2-amino-3,6,8-naphthalenetrisulfonic acid was coupled with 3-methylaniline under a weakly acidic condition and 50.1 parts of the resulting aminoazo compound was dissolved in 400 parts of water.

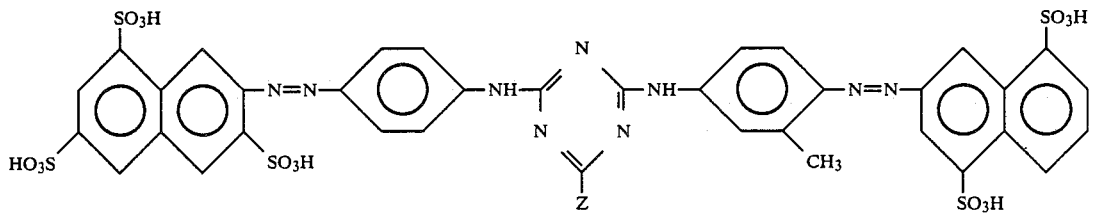

18.5 parts of cyanuric chloride was added to this solution at 5° to 10° C. and its pH was held at 5 to 6 by addiing sodium carbonate. Separately, diazotized 2-amino-4,8-naphthalenedisulfonic acid was coupled with 3-methylaniline under a weakly acidic condition, and 42.1 parts of the resulting aminoazo compound was dissolved in 400 parts of water. This solution was added to the reaction solution after the reaction was completed, and the mixture was heated to effect the reaction at 60° to 70° C. During the reaction, the pH was kept at 6 to 7 by adding sodium carbonate. The reaction solution containing the following compound, in the free acid form, were obtained.

TABLE 1

| | Z | λmax(mn) |
|---|---|---|
| 3 | SO₃H, —NH—phenyl | 388 |
| 4 | SO₃H, NH—phenyl—CH₃ | 390 |
| 5 | —NH—phenyl(SO₃H)(OCH₃) | 392 |
| 6 | —NH—phenyl(SO₃H)(OH) | 392 |
| 7 | —NH—phenyl(SO₃H)(COOH) | 388 |

Next, 26 parts of 4-aminobenzenesulfonic acid was added to the reaction solution and the resulting mixture was heated to effect the reaction at 90° to 95° C. During the reaction, sodium carbonate was added to keep the pH at 4 to 5. After the reaction was completed, 20% (to the volume of reaction solution) sodium chloride was added and the precipitated crystal was collected by filtration. The obtained compound corresponded to the one represented by the following formula: (as a free acid)

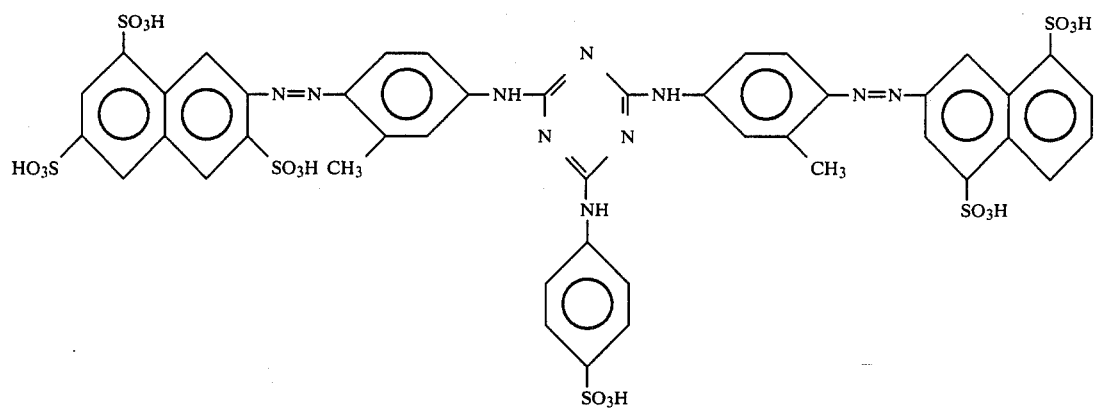

This compound dissolved in water and provided a yellow solution. Its λ max was 395 nm. The dye had a high substantivity to cotton and provided a clear reddish yellow dyed product. The color fastness was class 6 to light, class 4 to washing, class 4 to light and perspiration and class 4 to chlorine.

EXAMPLE 9 TO 13

Each compound was produced in accordance with the method of Example 8 except that each of the corresponding aminobenzenesulfonic acids of the formula (IV) was used in place of 4-aminobenzenesulfonic acid in the third condensation reaction. The obtained compounds, which were represented as free acids, and their λ max values were shown in Table 2.

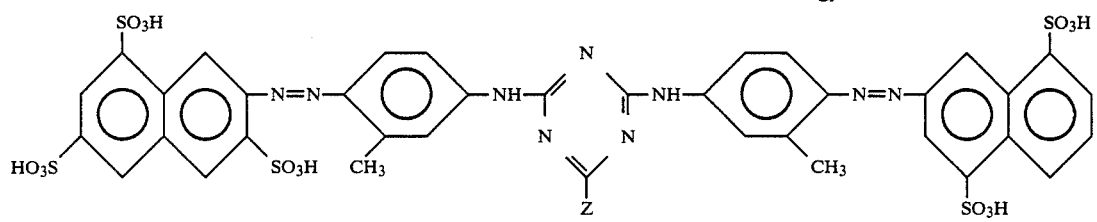

TABLE 2

| | Z | λmax(nm) |
|---|---|---|
| 9 | —NH—⌬—SO₃H | 395 |

TABLE 2-continued

| | Z | λmax(nm) |
|---|---|---|
| 10 | —NH—⌬—OCH₃ (SO₃H) | 396 |
| 11 | —NH—⌬—NHCOCH₃ (SO₃H) | 396 |
| 12 | —NH—⌬—Cl (SO₃H) | 393 |
| 13 | —NH—⌬(CH₃)(CH₃)—SO₃H | 395 |

Each of the compounds dyed cotton a clear reddish yellow color and its color fastness was good.

EXAMPLE 14 TO 25

Each of the aminoazo compounds of the corresponding formulas (II) and (III) was used as the starting compound and their λ max values in an aqueous solution and color tones on cotton were as follows:

Structure:

HO₃S-(naphthalene-SO₃H)-N=N-C₆H₂(X)(Y)(R₁)-N=N-C₆H₂(R₂)-NH-C(=N)-N=C(-N)-NH-C₆H₂(R₃)(R₄)-N=N-(naphthalene-SO₃H)(A)(B)

| | X | Y | A | B | R₁ | R₂ | R₃ | R₄ | Z | λ max(nm) | color tone on cotton |
|---|---|---|---|---|---|---|---|---|---|---|---|
| 14 | —SO₃H | H | —SO₃H | H | —OCH₃ | —CH₃ | H | —CH₃ | —NH—C₆H₄—SO₃H | 405 | Yellowish orange |
| 15 | H | —SO₃H | —SO₃H | H | H | —CH₃ | H | —CH₃ | —NH—C₆H₄—SO₃H | 385 | yellow |
| 16 | —SO₃H | H | —SO₃H | H | —OCH₃ | —NHCOCH₃ | —OCH₃ | —CH₃ | —NH—C₆H₄—SO₃H | 420 | orange |
| 17 | —SO₃H | H | H | —SO₃H | H | —CH₃ | H | —CH₃ | —NH—C₆H₄—SO₃H | 400 | reddish yellow |
| 18 | —SO₃H | H | H | —SO₃H | —CH₃ | —CH₃ | —CH₃ | —CH₃ | —NH—C₆H₄—SO₃H | 415 | orange |
| 19 | —SO₃H | H | —SO₃H | H | H | —C₂H₅ | H | —C₂H₅ | —NH—C₆H₄—SO₃H | 397 | reddish yellow |

-continued

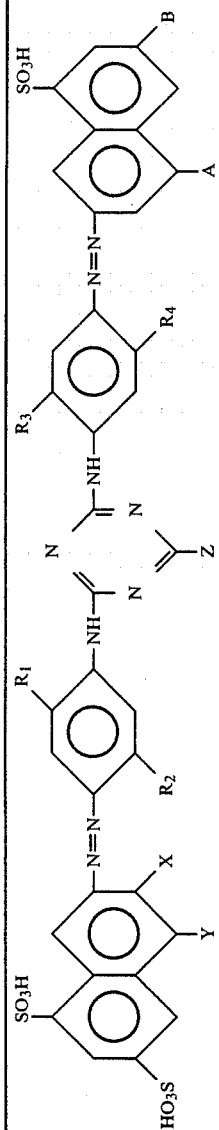

| | X | Y | A | B | R$_1$ | R$_2$ | R$_3$ | R$_4$ | Z | λ max (nm) | color tone on cotton |
|---|---|---|---|---|---|---|---|---|---|---|---|
| 20 | —SO$_3$H | H | —SO$_3$H | H | —OC$_2$H$_5$ | —OC$_2$H$_5$ | —OCH$_3$ | —CH$_3$ | —NH—C$_6$H$_4$—SO$_3$H | 423 | orange |
| 21 | —SO$_3$H | H | —SO$_3$H | H | H | —NHCO—C$_6$H$_5$ | H | —CH$_3$ | —NH—C$_6$H$_4$—SO$_3$H | 398 | reddish yellow |
| 22 | —SO$_3$H | H | —SO$_3$H | H | H | —NHCONH$_2$ | H | —CH$_3$ | —NH—C$_6$H$_4$—SO$_3$H | 398 | reddish yellow |
| 23 | H | —SO$_3$H | —SO$_3$H | H | H | —C$_2$H$_5$ | H | —C$_2$H$_5$ | —NH—C$_6$H$_3$(C$_2$H$_5$)(SO$_3$H) | 387 | yellow |
| 24 | H | —SO$_3$H | —SO$_3$H | H | —OCH$_3$ | —CH$_3$ | —OCH$_3$ | —CH$_3$ | —NH—C$_6$H$_3$(OC$_2$H$_5$)(SO$_3$H) | 397 | reddish yellow |
| 25 | —SO$_3$H | H | —SO$_3$H | H | —OCH$_3$ | —CH$_3$ | —OCH$_3$ | —CH$_3$ | —NH—C$_6$H$_3$(NHCO—C$_6$H$_5$)(SO$_3$H) | 407 | yellowish orange |

EXAMPLE 26

[Normal-pressure dyeing of cotton]

1 part of the disazo compound of Example 1 was dissolved in 4,000 parts of water and 60 parts of anhydrous sodium sulfate was then added and dissolved to prepare a dyeing bath of about 30° C.

200 parts of a jersey knitted fabric consisting of cotton was delivered into the dyeing bath and the temperature was raised to 90° C. in the course of about 40 minutes. The knitted fabric was held at that temperature for 30 minutes. The cotton jersey knitted fabric thus dyed was treated by a polyamine type fixing agent, washed with hot water and then with water, and thereafter dried.

A cotton jersey knitted fabric dyed a uniform yellow was obtained and its color fastness was extremely excellent.

EXAMPLE 27

[High-temperature acidic bath dyeing of cotton]

A dyeing bath was prepared in the same way as in Example 26 using the disazo compound of Example 1 and glacial acetic acid was further added to prepare a dyeing bath having a pH of 4.5.

200 parts of a cotton jersey knitted fabric was delivered into the dyeing bath and the temperature was raised to 130° C. in the course of 50 minutes. The knitted fabric was held at that temperature for 30 minutes (using a sealed pressurizing dyeing machine).

A cotton jersey knitted fabric that was dyed a uniform yellow was obtained.

No problems of inferior fixing and decomposition occurred under the conditions assuming the dyeing of a blended yarn fabric of polyester and cotton in a high temperature acidic bath and the result was comparable to that of the corresponding Example 26.

EXAMPLE 28

[High-temperature one-bath one-step dyeing of polyester/cotton blended yarn fabric]

A dye bath having a pH of 4.5 was prepared using 0.5 parts of the disazo compound of Example 8, 100 parts of anhydrous sodium sulfate, 1.0 part of Kayalon Polyester Light Yellow 5G-S (disperse dye, a product of Nippon Kayaku), 0.3 parts of Kayalon polyester Yellow BRL-S (disperse dye, a product of Nippon Kayaku), 6.4 parts of sodium acetate trihydrate, 4.2 parts of acetic acid and 4,000 parts of water.

After the dye bath was heated to 50° C., 200 parts of a blended yarn fabric of polyester and cotton (50/50) was delivered into the dye bath and the dye bath temperature was raised to 130° C. in the course of about 40 minutes. Dyeing was effected at that temperature for 45 minutes and the temperature was lowered down to 90° C. in the course of about 15 minutes. The dye bath temperature was kept at this temperature for 15 minutes. After the dyed product was withdrawn, it was treated by a polyamine type fixing agent, subjected to soaping, and washed with hot water and then with water.

A polyester/cotton blended yarn fabric that was dyed a clear yellow was obtained and its fastness was extremely good.

What we claim is:

1. A water-soluble azo compound which, in the free acid form, is represented by the following formula (1):

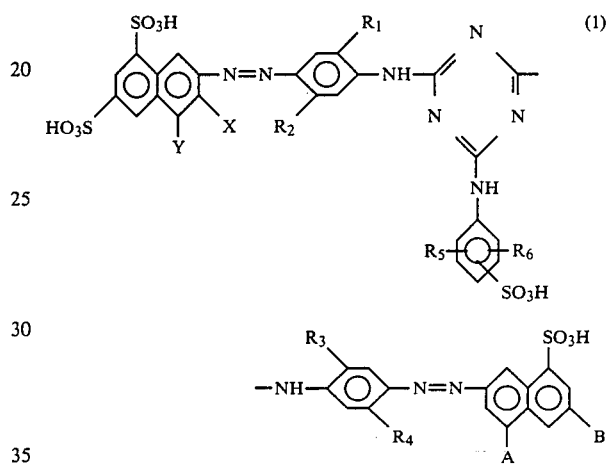

wherein one of X and Y is hydrogen and the other is —SO₃H; one of A and B is hydrogen and the other is —SO₃H; each of $R_1$, $R_2$, $R_3$ and $R_4$ is independently hydrogen, methyl group, ethyl group, methoxy group, ethoxy group, acylamino group or ureido group; and each of $R_5$ and $R_6$ is independently hydrogen, methyl group, ethyl group, methoxy group, ethoxy group, acylamino group, chlorine, hydroxyl group or carboxyl group.

2. A water-soluble azo compound according to claim 1 which, in the free acid form, is represented by the following formula:

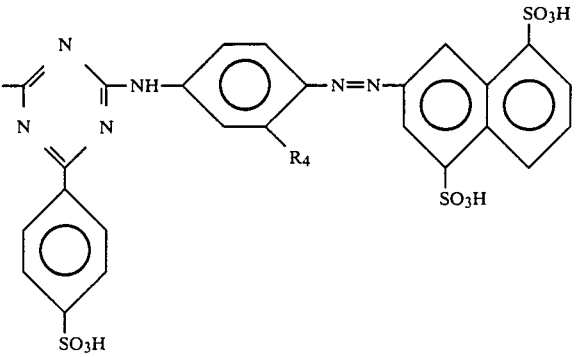

wherein each of $R_2$ and $R_4$ is independently hydrogen, methyl group, ethyl group, methoxy group, ethoxy group, acylamino group or ureido group.

3. A water-soluble azo compound according to claim 2 wherein $R_2$ and $R_4$ are methyl group.

4. A water-soluble azo compound according to claim 2 wherein $R_2$ is hydrogen and $R_4$ is methyl group.

5. A water-soluble azo compound according to claim 1 which, in the free acid form, is represented by the following formula:

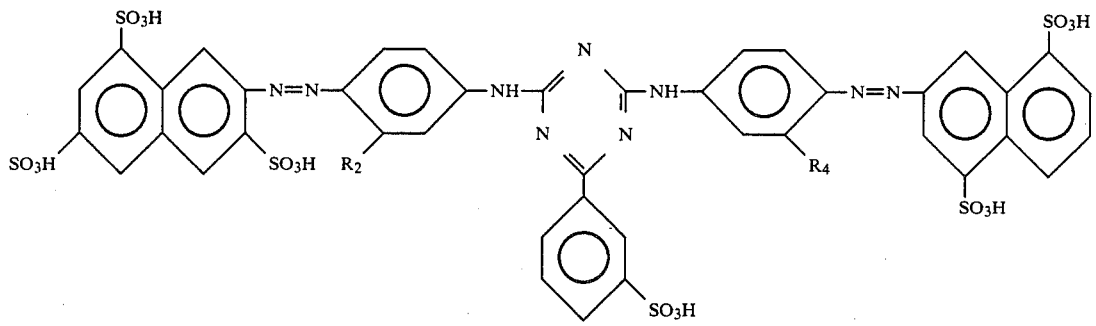

wherein $R_2$ and $R_4$ have the same meanings as above.

6. A water-soluble azo compound according to claim 5 wherein $R_2$ and $R_4$ are methyl group.

7. A water-soluble azo compound according to claim 5 wherein $R_2$ is hydrogen and $R_4$ is methyl group.

* * * * *